Figure 1:
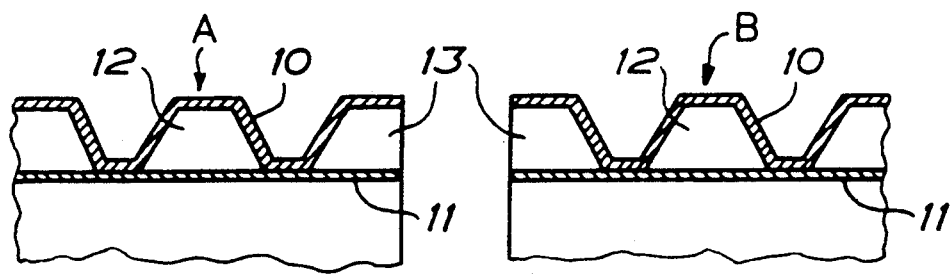

United States Patent [19]

Johansson et al.

[11] Patent Number: 5,053,097
[45] Date of Patent: Oct. 1, 1991

[54] METHOD OF JOINING TUBES HAVING A CORRUGATED WALL OF PLASTIC MATERIAL

[75] Inventors: Thomas Johansson, Landvetter; Ake Johansson, Fristad, both of Sweden

[73] Assignee: Uponor N.V., Philipsburg-Saint Maarten, Netherlands

[21] Appl. No.: 294,064
[22] PCT Filed: Jun. 23, 1987
[86] PCT No.: PCT/SE87/00291
 § 371 Date: Feb. 21, 1989
 § 102(e) Date: Feb. 21, 1989
[87] PCT Pub. No.: WO87/07935
 PCT Pub. Date: Dec. 30, 1987

[30] Foreign Application Priority Data

Jun. 23, 1986 [SE] Sweden ............................ 8602760

[51] Int. Cl.⁵ .................... B29C 65/02; F16L 47/02
[52] U.S. Cl. .................... 156/158; 156/159; 156/293; 156/294; 285/423; 285/903
[58] Field of Search ............... 156/157, 158, 159, 187, 156/192, 258, 272.2, 274.2, 275.1, 293, 294, 304.2, 304.6, 308.4, 380.6; 285/18, 21, 187, 423, 903, 909

[56] References Cited

U.S. PATENT DOCUMENTS 3,061,503 10/1962 Gould et al. .
3,865,662 2/1975 Segal ................................. 285/21
4,037,626 7/1977 Roberts ........................... 285/903
4,202,568 5/1980 Ström ............................... 285/903
4,234,781 11/1980 Flink ............................. 156/380.6
4,591,193 5/1986 Oltmanns et al. ................ 285/903
4,790,975 12/1988 Jävenkylä et al. ................ 264/508
4,824,502 4/1989 Nagayoshi et al. ............... 156/195

FOREIGN PATENT DOCUMENTS 0000977 1/1977 Japan ............................... 156/158
8007863-7 4/1982 Sweden .
WO8705376 9/1987 World Int. Prop. O. .

Primary Examiner—Michael W. Ball
Assistant Examiner—Steven D. Maki
Attorney, Agent, or Firm—Merchant & Gould, Smith, Edell, Welter & Schmidt

[57] ABSTRACT

A method of joining tubes (A and B) having a corrugated wall (10) of fusible plastic material and terminating at a cut through a corrugation rib, comprises the following steps. An annular body (14) expanding when energy is supplied to it, is positioned in an annular space (13) formed by the corrugation ribs at the end of one tube (A) and an inner boundary which can be formed by an inner wall (11) of fusible plastic material, integral with the corrugated wall of said one tube, or by a sleeve inserted into the adjacent ends of the tubes, also of fusible material. The tube ends are put together to close said space by the end of the other tube (13), and a radial and axial support (19) for the corrugation ribs is arranged on the outside of the tubes. Then, the annular body is expanded by heating to fuse said body to the walls of the tubes and the sleeve, respectively.

6 Claims, 2 Drawing Sheets

METHOD OF JOINING TUBES HAVING A CORRUGATED WALL OF PLASTIC MATERIAL

The invention relates to a method of joining tubes and more particularly to a method of joining tubes having a corrugated wall of a fusible plastic material, by heat welding, the tubes at the ends to be joined terminating at a cut through a corrugation rib.

The purpose of the invention is to make possible that a homogenous and reliable joint between the tubes is provided by relatively simple working operations. Particularly, it is intended to provide for double wall tubes having a corrugated outer wall and a smooth inner wall, a joint which does not produce irregularities on the inside surface of the inner tube, which could interfere with the flow pattern in the tube.

The purpose mentioned above is achieved by the method of the invention having obtained the characterizing features of claim 1, which means that an annular body known per se, which expands when heated, is utilized in a specific manner.

Figure 2:
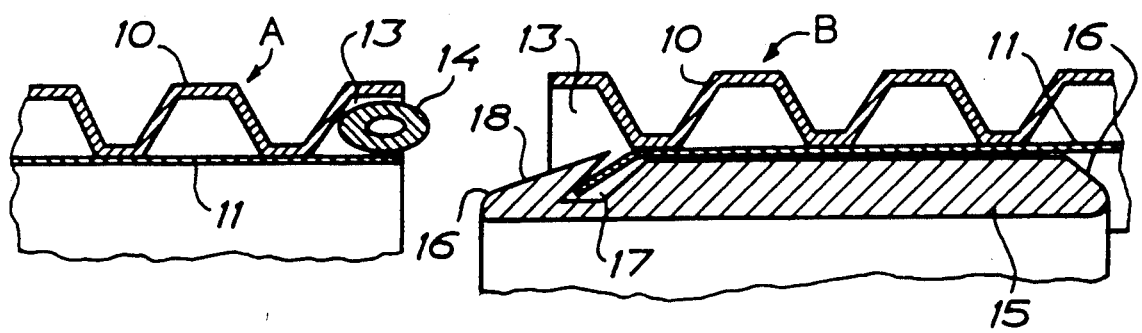
Figure 3:
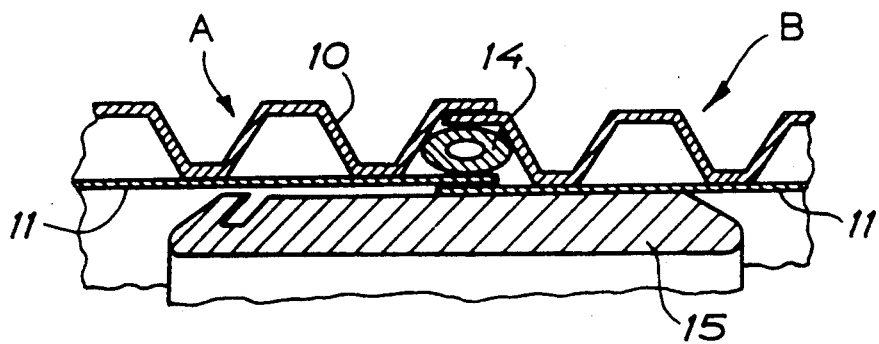
Figure 4:
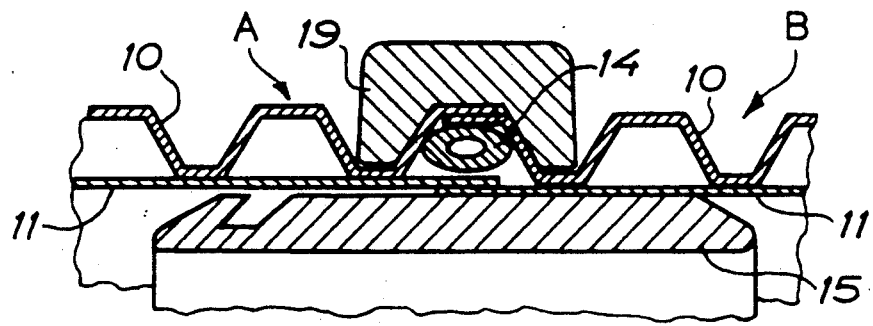
Figure 5:
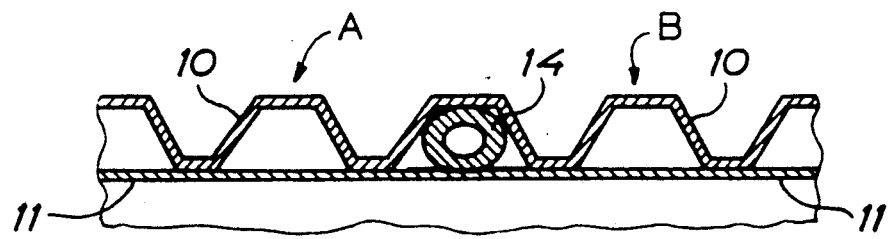
Figure 6:
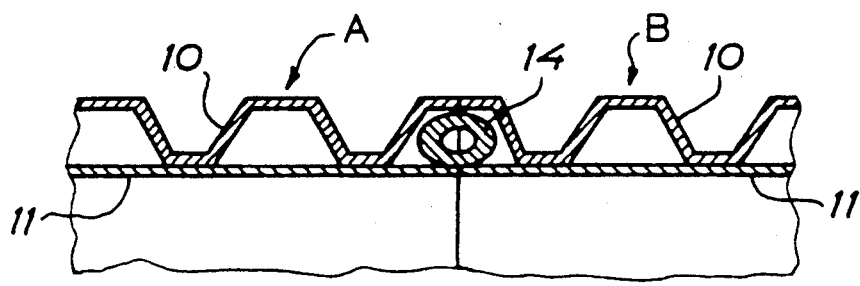
Figure 7:
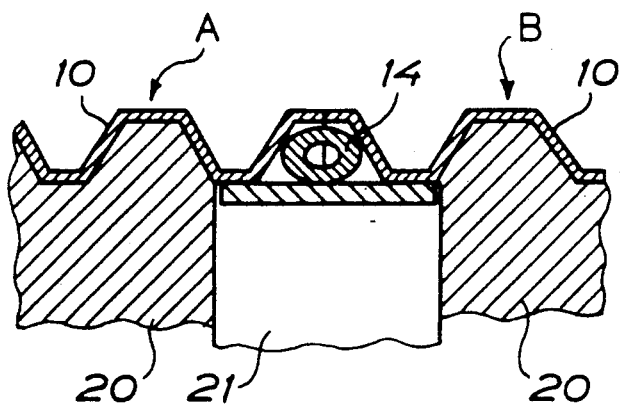

The invention will be explained in more detail below, reference being made to the accompanying drawings in which FIG. 1 is a fragmentary diagrammatic axial sectional view of the adjacent end portions of two double wall tubes to be joined, FIG. 2 is a corresponding axial sectional view of the tubes in an initial step of the method of the invention, FIG. 3 is a corresponding axial sectional view of the tube ends when they have been put together in order to provide an overlap joint, FIG. 4 is a corresponding axial sectional view illustrating the welding step proper, FIG. 5 is a corresponding axial sectional view of the completed joint between the tube ends, FIG. 6 is a view corresponding to FIG. 3 which illustrates an abutment joint, and FIG. 7 is a view corresponding to FIG. 3 which illustrates a joint of single wall corrugated tubes.

FIGS. 1 to 5 disclose the application of the method of the invention to double wall corrugated tubes A and B of the type having a corrugated outer wall 10 and a relatively thinner smooth inner wall 11, both walls being made of a fusible plastic material. The corrugated outer wall can be made of polyethylene while the inner smooth wall can be made of polyethylene or a fusible elastomer. The double wall tube in said latter embodiment can be bent rather easily so as to be well suited for relining of underground pipe lines. The outer and inner walls are interconnected at the corrugation grooves in a known manner and thus form closed annular cavities 12. The adjacent tube ends terminate at a cut through the corrugation ribs so that there is at each end an open annular cavity 13. In the open cavity at the end of the tube A an annular body of a type known per se is inserted, said annular body expanding when energy is supplied to it. In this case, the annular body comprises a tubular ring 14 of oval cross-sectional shape. The ring can be made e.g. of a PEX tube which has been produced with circular cross-sectional shape and then after heating has been deformed to the oval shape and has been allowed to cool in this shape. The PEX tube is wound with a heating wire (not shown) to be connected with a power source, and is coated with polyethylene on the outside surface thereof.

In the other tube B a stiffening cylindrical mandrel 15 is inserted, having chamfered end edges 16 and a circumferential inclined groove 17 in the outside surface thereof to receive therein the end portion of the thin and rather soft inner wall 11 of the tube B as shown in FIG. 2.

When the tube ends have been arranged in this manner, they are put together, the mandrel at the outer end thereof forming a ramp 18 to lift the tube A slightly when it is pushed onto the mandrel such that the outside wall of this tube will be located over the outer wall of the other tube B as will be seen in FIG. 3. The mandrel 15 is displaced axially to such position that it extends over the joint between the tubes. Then, there is also obtained an overlapping between the inner walls when the end portion of the inner wall of the tube B received in the groove is drawn off the groove at the displacement of the mandrel. An outer fixture 19 is arranged so as to encircle the tubes in the joint area in order to locate together with the mandrel functioning as an inner fixture, the established overlap joint during the welding step which now follows. The mandrel 15 may be expandable so that it can be pressed against the tubes and also so that it can be contracted and thus more easily can be inserted into and withdrawn from the tubes.

The welding step comprises connection of the heating wire to a power source for heating the ring 14 which tends to return to the original circular shape thereof during heating due to the so-called memory effect. At the same time, the plastic material of the outer and inner walls and also the plastic material on the outside surface of the ring is fused such that there is obtained a homogenous transition between the tubes, the ring being welded to the walls. The fixture and the mandrel can be removed, and the completed joint has now the appearance illustrated in FIG. 5.

In case of the more common tube type, the outer and inner walls of which both are made of polyethylene and have substantially the same thickness, the joint can be arranged as an abutment joint according to FIG. 6. Then, the tube ends are welded to each other at the abutting annular end surfaces of the outer and inner walls, but are also welded to the ring 14. Under the influence of the pressure exerted by the ring 14 during expansion thereof, the material of the outer wall may become thin, and in order to compensate for this a strip of polyethylene can be wound around the tubes on the outside surface thereof in the joint area prior to welding and application of the outer fixture.

It should be observed particularly that there is obtained by applying the method of the invention a smooth inside surface of the inner tube. Thus, there is no risk of inside projections being produced in the joint area, which could interfere with the flow through the tubes.

The method of the invention can also be applied to single wall tubes having a corrugated wall, e.g. heat culvert tubes which comprise an outer corrugated polyethylene covering 10 enclosing a heat insulating foamed plastic material 20, usually foamed polyethylene, crosslinked polyethylene, or polyurethane, as shown in FIG. 7. In this case, the foamed plastic material is removed from the tube ends such that a cylindrical polyethylene sleeve 21 can be inserted into the tube ends so as to extend over the joint therebetween. This sleeve forms a support for the ends of the corrugated covering tubes, and during the welding step the ring 15 will adhere to the sleeve as well as the covering tubes, a rigid and reliable joint being obtained thereby.

We claim:

1. Method of joining first and second double-walled tubes, each having a mating end and a corrugated outer wall forming corrugation ribs and an inner wall joined to said outer wall between said ribs, both walls being made of a fusible plastic material, the outer wall of each tube having a diameter larger than the inner wall of the other tube, comprising the steps of:
   a) cutting each tube through a corrugation rib at the tube mating end to open an annular groove formed between the walls at said corrugation rib;
   b) positioning an annular body expandable when energy is supplied to it, in said annular groove of one of said tubes;
   c) putting the tube ends together to form a closed annular space with said body enclosed therein, such that one portion of the annular body is proximate said outer wall of said first tube, and another portion of the annular body is proximate said inner wall of said second tube; and
   d) heating said body to expand the body and to fuse the body to the first and second tubes.

2. Method of joining double-walled tubes having mating ends, each tube having a corrugated outer wall forming corrugation ribs and an inner wall integral with the outer wall, both walls being made of a fusible plastic material, the outer wall of each tube having a diameter larger than the inner wall of the other tube, comprising the steps of
   a) cutting each tube through a corrugation rib to open an annular groove formed between the walls at said corrugation rib at said end of each said tube;
   b) positioning an annular body expanded when energy is supplied to it, in said annular groove of one of said tubes;
   c) putting the tube ends together to form a closed annular space of said grooves with said body enclosed therein;
   d) providing on the outside of the tubes a radial and axial support for the corrugation ribs bounding said space;
   e) heating said body to expand the body and to fuse the body to the outer and inner walls of the tubes; and
   f) removing said support from the tubes.

3. Method as in claim 2 wherein an overlap joint is formed by the corrugated walls and the inner walls of said tubes when put together.

4. Method as in claim 2 wherein an abutment joint is formed by the corrugated walls and the inner walls of said tubes when put together.

5. Method as in claim 2 wherein the corrugated walls of said tube are wound with a strip of fusible plastic material in the joint area.

6. Method as in claim 2 wherein a mandrel is inserted in said tubes to support the inner walls on the inside thereof.

* * * * *